United States Patent [19]

Stoffel et al.

[11] Patent Number: 5,428,377

[45] Date of Patent: Jun. 27, 1995

[54] COLOR SPATIAL FILTERING FOR THERMAL INK JET PRINTERS

[75] Inventors: James C. Stoffel, Rochester; Roger G. Markham, Webster, both of N.Y.

[73] Assignee: Xerox Corporation, Stamford, Conn.

[21] Appl. No.: 927,983

[22] Filed: Aug. 11, 1992

[51] Int. Cl.⁶ .............................................. B41J 2/21
[52] U.S. Cl. ........................................ 347/15; 347/43; 358/518; 358/529
[58] Field of Search ............. 346/1.1, 75, 140 R, 346/157; 358/75, 502, 504, 518, 519, 521, 523, 529, 298; 347/5, 9, 12, 15, 41, 43

[56] References Cited

U.S. PATENT DOCUMENTS

| | | |
|---|---|---|
| 4,469,433 | 9/1984 | Kurata et al. |
| 4,595,948 | 6/1986 | Itoh et al. .................. 346/140 R |
| 4,631,578 | 12/1986 | Sasaki et al. .................. 358/502 |
| 4,724,477 | 2/1988 | Ellis et al. |
| 4,894,665 | 1/1990 | Davis .................. 346/1.1 |
| 4,953,015 | 8/1990 | Hayasaki et al. |
| 4,959,790 | 9/1990 | Morgan |
| 5,031,034 | 7/1991 | Shimizu et al. .................. 358/529 X |
| 5,047,844 | 9/1991 | Ikeda et al. |
| 5,070,413 | 12/1991 | Sullivan et al. |
| 5,241,396 | 8/1993 | Harrington |
| 5,315,382 | 5/1994 | Tanioka .................. 358/529 X |

FOREIGN PATENT DOCUMENTS 0533411  3/1993  European Pat. Off.

Primary Examiner—Benjamin R. Fuller
Assistant Examiner—John E. Barlow, Jr.
Attorney, Agent, or Firm—Oliff & Berridge

[57] ABSTRACT

A color spatial filter for ink jet color printers, especially four color CYMK printers. The printer includes an enhanced print mode and associated logic circuitry which examines and corrects black pixel coloring to increase black picture quality and reduce intercolor bleeding. This is accomplished by examining a surrounding neighborhood of pixels around each pixel as they flow to a color swath print buffer and selecting a method of correcting the representation of each pixel, based on a set of predetermined rules, to produce black by choosing either K, a slow-drying high density ink, or CYM, a fast-drying ink having low intercolor bleeding to thereby control bleeding characteristics that provide the best copy quality images. A lookup table may be used for greater gradations of black representation. Alternatively, printing may be performed using a color printer having two black inks, each with different drying rates and picture qualities. In this case, the filter examines the color space pixel planes and enhances the image by updating the color space pixel planes with $CYMK_1K_2$ based on each pixel and its associated neighborhood of values.

28 Claims, 6 Drawing Sheets

COLOR SPATIAL FILTERING FOR THERMAL INK JET PRINTERS

BACKGROUND OF THE INVENTION

1. Field of the Invention

The present invention relates to color spatial filtering for ink jet printers or the like and more specifically, to an enhanced print mode and associated circuitry for a thermal ink jet printer which corrects black pixel coloring to increase black picture quality and reduce intercolor bleeding.

2. Description of Related Art

There is a need for high quality black text and graphics and color text graphics and pictorials on plain paper. Current state of the art thermal ink jet printers have fast drying CYMK (Cyan, Yellow, Magenta, Black) ink for color and low intercolor bleed, but the black picture quality needs to be improved (e.g., line edge sharpness).

Various methods of modifying color data prior to printing are known. U.S. Pat. No. 4,959,790 to Morgan discloses an apparatus and method for producing color corrected reproduction of colored original images. This particular apparatus was designed for the purpose of correcting for the effects of linearity failures of various coloring agents. A scanner provides input signals representing primary color readings. A memory stores increments of primary color readings and correlation factors. The apparatus determines final coloring agents based on contribution amounts from the respective coloring agents read from the scanner. This method has a black enhancement mode which merely adds a black color if criteria for a particular pixel indicate a high density at that pixel location. This enhancement is for the purpose of enhancing representation of shadows in the image.

U.S. Pat. No. 4,724,477 to Ellis et al. discloses an image enhancement apparatus wherein an image is represented by color picture components. Fringe signal generators derive a plurality of sharp and unsharp signals in a predetermined manner, and a correction circuit connected in parallel with the fringe generators modifies the signals to provide modified output signals. A black definition signal is also derived from the original pixel signals and summed with the original signal to derive a black output signal. Preferably, the black fringe signal is only summed when the black value is above a predetermined threshold.

U.S. Pat. No. 5,070,413 to Sullivan et al. discloses a halftoning method for creating a continuous tone color image which improves perceived visual color by including a visual color blur function such that a perceived color vector rather than binary color error is propagated. Input color vectors are transferred to a preferred color space to give new color vectors. An output vector is then selected for each new vector color. A neighborhood of previously selected output vectors weighed by a human visual system blur filter produces a blurred output vector. This method is used to correct a continuous tone color image, reducing noise and worms.

Numerous problems are associated with present enhancement methods and apparatus. In particular, no known apparatus addresses a problem inherent with current ink jet printers relating to high quality color image production while reducing or eliminating intercolor bleed. This intercolor bleed is due to the use of a slow drying black ink for four color ink jets. While the slow drying ink commonly used provides high quality reproduction of black images, it also can easily bleed into adjacent areas which may contain other colors. If a fast drying black ink is used for the printer, the intercolor bleed is reduced or eliminated, but accompanying that is a reduced quality of black reproduction since current fast drying black inks have lower picture quality than their slow drying counterparts. Additionally, black could be reproduced by a combination of the other colors, i.e., Cyan, Yellow and Magenta (CYM). This too reduces intercolor bleed, but also results in a reduced quality of black reproduction since current colored inks CYM do not provide the high quality picture associated with printing with a good black ink.

Accordingly, there is a need for an ink jet printer which is capable of reproducing black on a pixel- by-pixel need based on characteristics of surrounding pixels such that the prior compromise between intercolor bleed and high quality need not be sacrificed.

Future ink formulations and papers may improve drying time and reduce spread, and even black picture quality, but present printers need to resolve these problems without unduly increasing printer costs.

OBJECTS AND SUMMARY OF THE INVENTION

It is an object of the present invention to provide a simple, low cost method and apparatus for improving overall print appearance of an image produced by an ink jet printer.

It is another object of the present invention to provide a method and apparatus for selecting a specific representation of black on a pixel-by-pixel basis.

It is another object of the present invention to provide a spatial color filter which selects an appropriate representation of black which reduces intercolor bleeding, yet improves overall black picture quality.

It is yet another object of the present invention to provide a selectable enhancement mode for enhancing a color image using a four color CYMK system which optimizes printing of black pixels by examining a neighborhood of adjacent pixels and selecting an appropriate modified pixel value based on a predetermined set of rules by comparing the neighborhood with a lookup table and selecting an appropriate modified value.

These and other objects are achieved by the present invention in which a color pixel spatial filter mode is added to a color ink jet printer. The filter examines each pixel to be printed, along with a neighborhood of surrounding pixels and selects an appropriate method to produce black pixels and/or enhance adjacent pixels to either 1) avoid bleeding pathologies or 2) optimize black text quality. Overall, the image to be printed contains a high quality representation of black portions, while minimizing intercolor bleeding near boundaries between black and colored portions of the image.

There are numerous advantages to the present invention. The filter is simple and uses a low cost gate array and logic. The filter is application and operating system independent. The filter allows for future ink improvements and allows user selection of modes. The filter is compatible with Mac and DOS worlds using a "dumb printer". Good picture quality is enabled using a four color printer on plain paper without encountering the intercolor bleeding of prior printers.

DETAILED DESCRIPTION OF PREFERRED EMBODIMENTS

Figure 1:
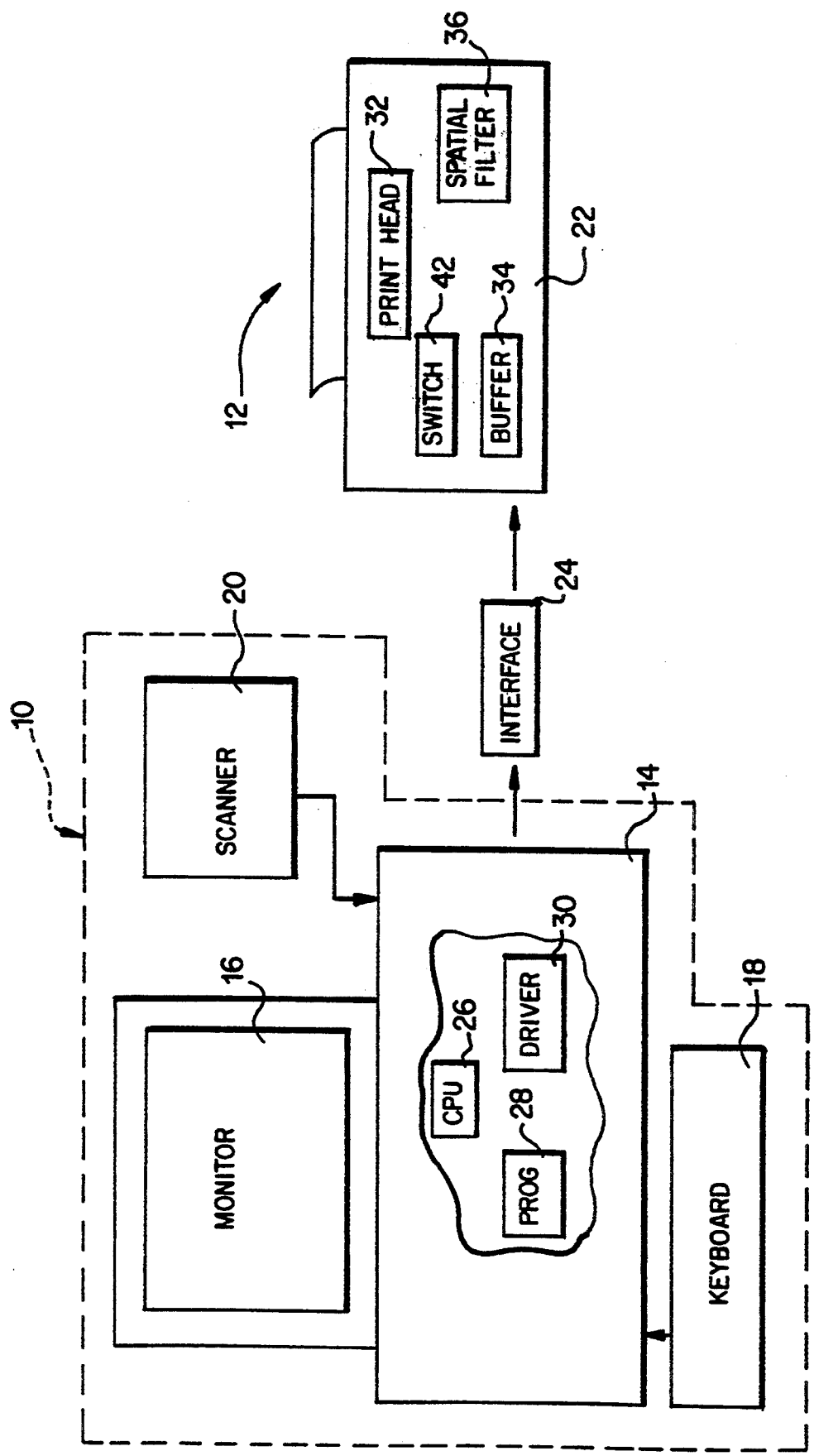
FIG. 1 is a schematic representation of a personal computer system including a printer according to the present invention having an enhanced mode switch and buffers.

With reference to FIG. 1, there is shown a printing system comprising a color image generating section 10 and a printing section 12. The color image generating section 10 may comprise a computer 14 connected to a monitor 16 and a keyboard 18 or may comprise a scanner 20 which is capable of scanning a color image and representing the image in a predetermined color space. The printing section 12 comprises a color ink jet printer 22 and is connected to the color image generating portion 10 through an appropriate interface 24 such as a RS232C, 422 or similar interface. The computer 14 further comprises a microprocessor 26 which runs an applications program 28 and a graphics driver 30 which form and present picture signals representing an image to the printer 22 via the interface 24. The picture signals may be in any commonly used color space scheme such as RGB, CIELAB, CIELUV, YIQ, CMYK, OR CYM.

The ink jet printer 22 may be of any standard type having at least one printhead 32 for printing color inks and a color swath buffer 34 for storing signals representing the image prior to printing.

A color spatial filter 36 according to the present invention receives data signals representing an image from the color generating portion 10 in CYMK color space. If the color generating portion 10 sends signals in a color space other than CYMK, a transformation filter 38 may be utilized to convert the data signals to CYMK color space having four color pixel planes 40, one for each color Cyan, Yellow, Magenta and Black (CYMK). These signals are scrolled or rastered through the color spatial filter 36 to enhance the values, reducing intercolor bleeding and improving black picture quality. The color spatial filter 36 preferably comprises a gate array, such as a 5×5 matrix gate array which contains simple boolean logic. The filter may also consist of a processor which evaluates the logic rules. A lookup table may be provided which stores comparative matrix values used to determine an enhanced value for each examined pixel.

Preferably, the color spatial filter 36 further includes a color spatial filter mode switch 42 located on the printer 22 and movable between an ON and an OFF position. The switch 42 can be used to activate or deactivate the filter 36. The present invention when used with any standard thermal ink jet printer is compatible with both Mac and DOS worlds.

Figure 2:
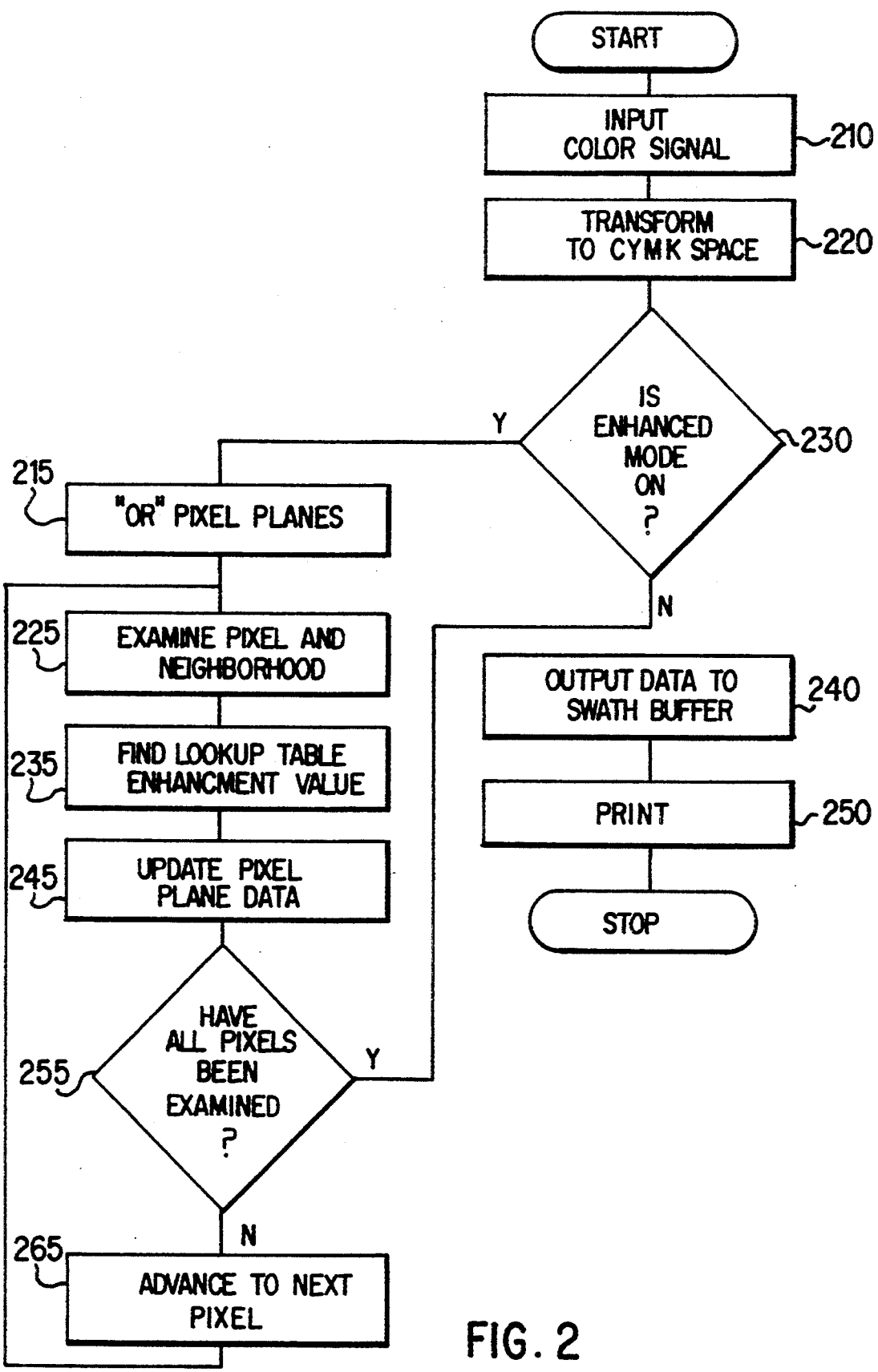
FIG. 2 is a flowchart showing the various steps necessary to output and print enhanced color images from input data values from a source such as a computer.
Figure 3:
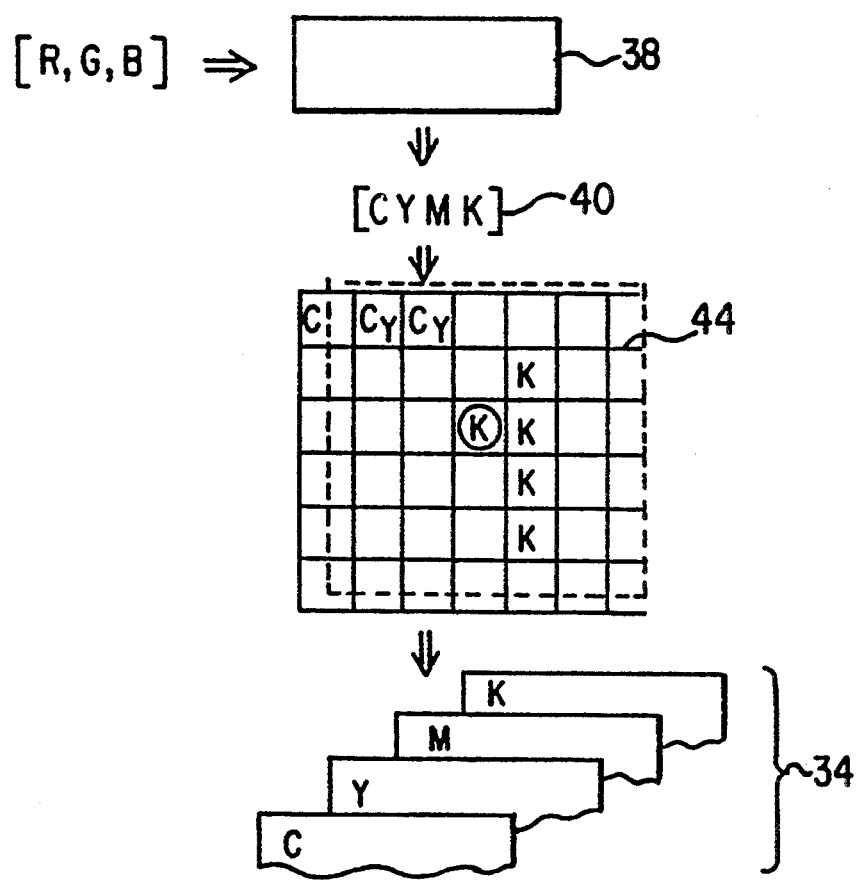
FIG. 3 is a diagram of how data is converted from RGB through a transformation filter to form CYMK values, oriented in pixel planes and output to a color swath buffer.

With reference to FIG. 2, printer 22 including the color spatial filter 36 and associated hardware performs the following steps. An image is created through a graphics application program 28 or scanned in by scanner 20 associated with the computer 14. The computer 14 sends picture color signals in a color space such as RGB to the printer 22 through the interface 24 (step 210). These signals are transformed into CYMK space by appropriate hardware into four pixel planes 40, one for each color Cyan, Yellow, Magenta and Black (CYMK) (step 220). Next (step 230), if the enhanced print mode is OFF, i.e., the switch 42 is OFF, the transformed signals are output to the color swath buffer 34 (step 240). This allows for future ink upgrades that do not need enhancement, the use of a compatible low-bleed black and printing on coated or selected paper stock.

If the enhanced print mode is ON, i.e., when switch 42 is ON, color spatial filter 36 is activated which incrementally scrolls through the pixel planes 40 as they flow to the color swath buffer 34 and sums the pixel planes in an "OR" fashion to form a temporary combined pixel plane 44 (step 215). Each pixel in the combined pixel plane 44 is incrementally examined along with a neighborhood of pixels (step 225). The neighborhood may encompass any particular size of matrix best suited for the application or intended use optimizing quality and efficiency. A 5×5 matrix is preferred. For this case, the filter scrolls through five rows of the pixel planes and examines a center pixel and the 24 surrounding pixels adjacent thereto in the 5×5 matrix after the pixel planes have been summed. Each pixel and surrounding neighborhood of pixels are analyzed by simple logic to best find an enhancement value for the pixel which best represents that particular pixel without compromising intercolor bleed of the black ink into any adjacent color areas (step 235). After an enhancement value is determined based on a predetermined set of rules, the pixel planes 40 are updated with the enhanced value for that particular pixel prior to storing the values in the color swath buffer (step 245). The predetermined set of rules may be a simple threshold technique which distinguishes between adjacent blank areas, adjacent color areas and adjacent black areas, or may be more sophisticated and include one or more lookup tables having data representing a plurality of matrix values, against which the pixel in question and its surrounding neighboring pixel are compared. Generally, the filter 36 will enhance the image data such that a particular black pixel will be printed using the colors CYM if surrounding areas contain a predetermined amount of color values representative of a color border center pixel. If the surrounding area contains a certain predetermined amount of black pixels, the black pixel is printed with K since any intercolor bleeding in this case would have minimal effect on adjacent pixels and printing of this pixel with K will increase the $D_{max}$, i.e., increase picture quality. This examining and replacement continues for each pixel in the pixel planes. Step 255 checks if all pixels have been examined. If not, step 265 advances back to step 225. If all the pixel planes 40 have been updated, the color swath buffer 34 contains updated pixel plane data (step 240). This is followed by printing of the image representing the data in the color swath buffer 34 by the printhead 32 of printer 22 (step 250).

Generally, a preferred filter 36 converts all three color (CYM) blacks to black. If a black pixel is judged not to be part of a substantial black area, then the pixel is replaced with a three color black. If a black pixel is judged to be part of a substantial black area, then all color pixels within a three pixel radius are erased.

In a first example of the filter, the incoming image having all three color black converted to black as a raster is added to the filter's stack of rasters. As the raster of black is scanned (from left to right), a black pixel is judged to be connected to a black area if one of the following criteria is true: 1) the pixel has a connected black pixel above or to the left; or 2) the pixel has a black neighbor to the right and a black neighbor directly below and these neighbors have black neighbors that have black neighbors. Only the quadrant to the right and below are searched for these neighbors. In this example, black pixels can be used twice to meet this criteria.

This particular filter has less than maximal complexity because condition 1 takes care of four rotations of condition 2 about the pixel in question and excludes conditions that are symmetric about the point in question. In this example, "neighbors" is meant to exclude diagonally adjacent pixels. The smallest area that can be judged connected contains five pixels in a very compact configuration.

A second example of filter 36 is generally the same as the first, except the conditions used to judge a black pixel to be connected to a substantial area are fully symmetric. Thus, a black pixel is judged to be connected if one of the following is true: 1) the black pixel has a black neighbor to the left and a black neighbor above, and these pixels have black neighbors who have black neighbors; 2) the same as 1) except the first two neighbors are to the left and below; 3) the same as 1) except the first two neighbors are to the right and below; 4) the same as 1) except the first two neighbors are to the right and above; 5) the same as 1) except the first two neighbors are to the right and left; and 6) the same as 1) except the first two neighbors are above and below.

Once again, "neighbors" is meant to exclude diagonally adjacent pixels. However, it may be useful to have the filter analyze the diagonally adjacent pixels. In this example, the smallest area that can be judged connected contains five pixels in a very compact configuration. All multiple 90° rotations and reflections of this shape will be judged the same. In many ways, this second algorithm gives more uniform response to the incoming bit patterns.

Figure 4A:
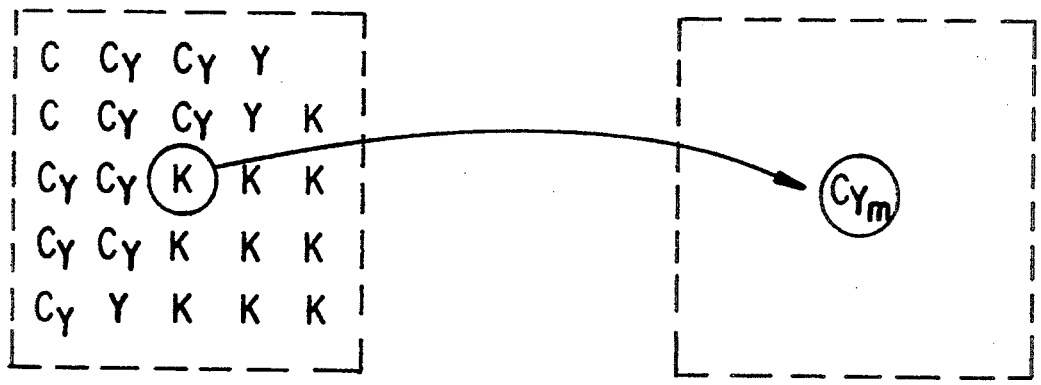
FIGS. 4a-c are examples of the logic used to determine representation of black pixels according to a first embodiment of the present invention.
Figure 4B:
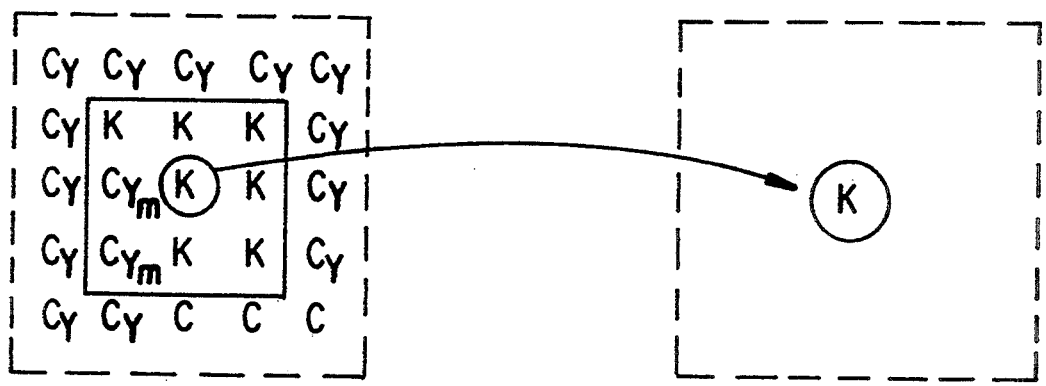
Figure 4C:
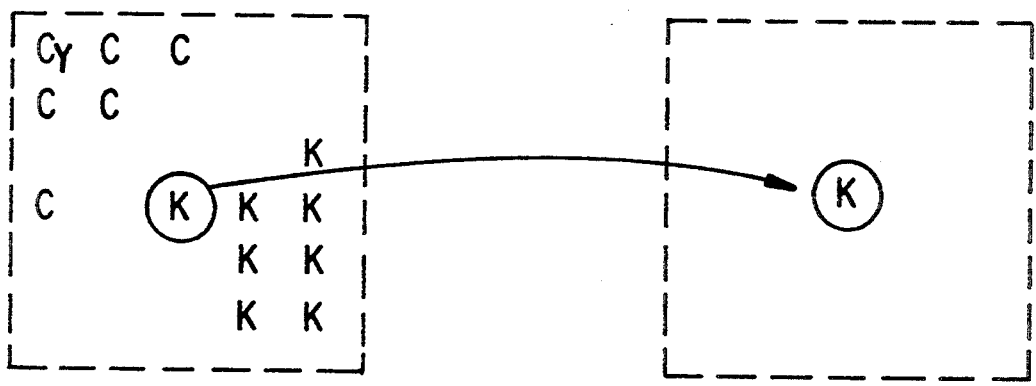

According to a first embodiment, the printer 22 utilizes a slower drying high quality black ink (K) which bleeds into adjacent pixels and fast dry, low bleed Cyan, Yellow and Magenta (C,Y,M). Simple logic examines each pixel and a neighborhood of pixels, for example a 5×5 matrix, and prints black and white text, graphics and pictorials with K. Color areas are printed with C,Y,M. Black pictorial pixels surrounded by black pixels are printed with K to enrich the pictorial $D_{max}$. Adjacent regions, i.e., regions with black and other colors in the neighborhood, are printed according to simple logic as shown in FIGS. 4a–c. If surrounding pixels in the neighborhood include colors other than black, the black pixel is printed with low bleed CYM for color edge detail transition (FIG. 4a). If the surrounding pixels in the neighborhood are primarily black, the black pixel is printed with more dense, higher quality black (FIG. 4b). If the black pixel is isolated, i.e., has surrounding pixels with no color, the black pixel is printed with K (FIG. 4c). The logic may be a gate array which implements boolean logic to map pixels which are either 1 or 0 to corrected values. Preferably, the gate array is a 5×5 matrix having 25 inputs and one output and works on the binary pixel planes as the pixel planes 40 are flowing to the color swath print buffer 34. A lookup table may be used to provide more gradation steps for printing the black pixels using various combinations of the CYM and K inks and gray scale techniques to best print the pixel with improved print quality and low intercolor bleed.

Figure 5A:
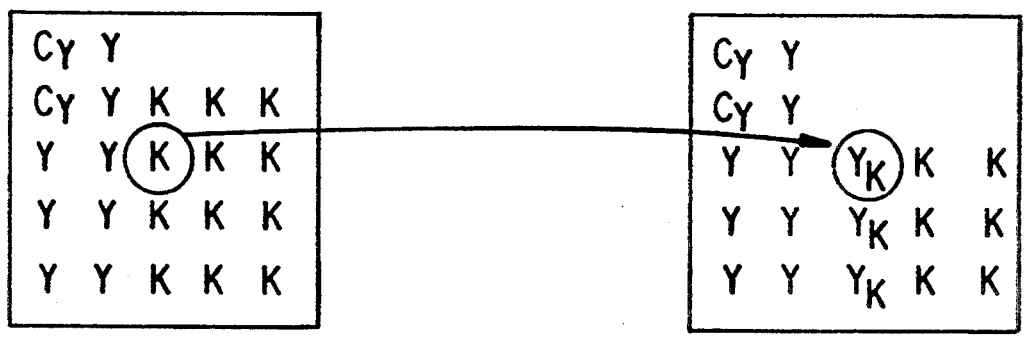
FIGS. 5a-c are examples of the logic used to determine representation of black pixels according to variations of the first embodiment.
Figure 5B:
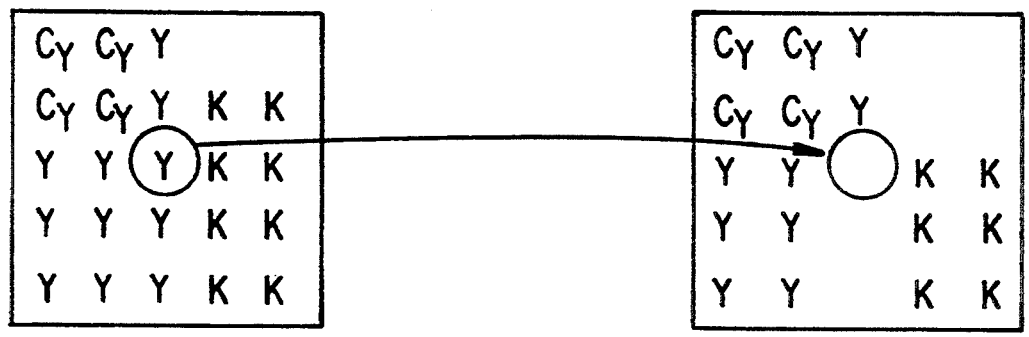
Figure 5C:

Various other alternative logic arrangements can be utilized depending on the results desired and specific inks used. For example, as shown with reference to FIGS. 5a–c, if a black pixel has black pixels surrounding it on one side and colored pixels on the other, i.e., a border situation, one or more of the border black pixels can be printed with fast dry Cyan, Magenta or Yellow ink "below" the slow dry black (FIG. 5a). Another option with border black pixels, as previously discussed, would be to create a white pixel border in one or more color pixels adjacent a black border area by deleting the background color (FIG. 5b). This would eliminate intercolor bleed and in some instances provide a better defined image than other approaches. Another alternative would be a combination of the previous two alternatives whereby a white pixel border is created in one or more color pixels adjacent a black border area and the black border area is first printed with the fast drying background color "below" the slow drying black (FIG. 5c).

In a second embodiment, a printer 22 having two black print inks is used. One of the black inks ($K_1$) is fast drying, but leaves blurred edges and has a somewhat low $D_{max}$ and limited bleeding. The other black ink ($K_2$) has sharper edges, a higher $D_{max}$ and bleeds.

Figure 6A:
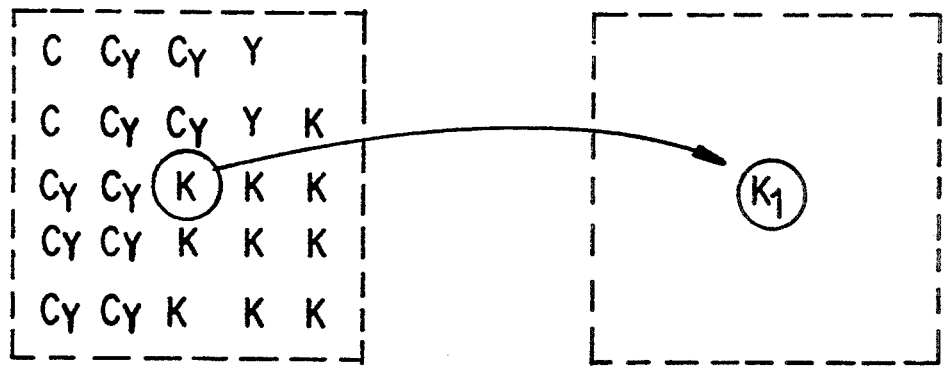
FIGS. 6a-c are examples of the logic used to determine representation of black pixels according to a second embodiment of the present invention.
Figure 6B:
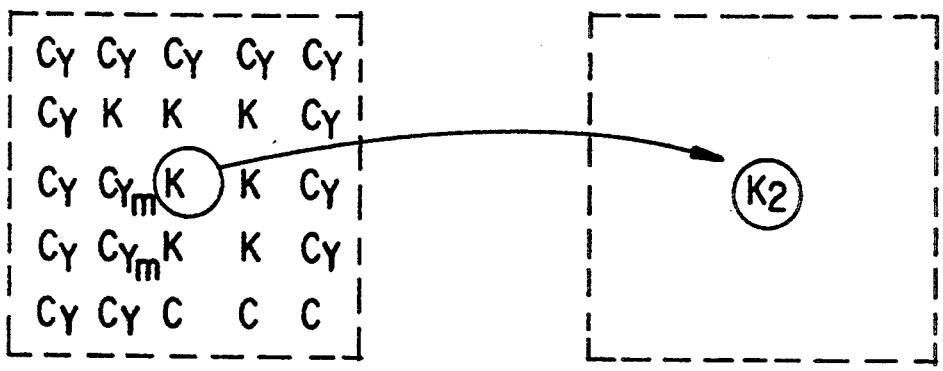
Figure 6C:
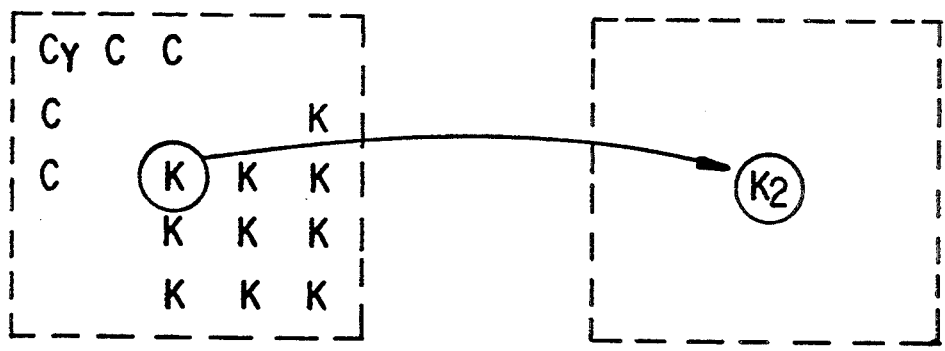

According to this embodiment, as shown in FIGS. 6a–c, black and white text, graphics and pictorials are printed with $K_2$. Color areas are printed with CYM. Black pixels having surrounding color pixels are printed with low bleed $K_1$ (FIG. 6a). Black pixels having primarily black surrounding pixels in the neighborhood are printed with high quality, more dense black ink (FIG. 6b). Black pixels which are isolated, i.e., having surrounding areas with no color, are printed with $K_2$ (FIG. 6c) since bleeding is not an issue. A lookup table may be provided for intermediate values to provide more accurate, high quality color reproduction with minimal bleeding.

The present inventive filter and printer containing such is preferably constructed using hardwired logic such as gate arrays or EPLD since these would stream through the images in short order because all logic paths are explored in parallel in a single clock cycle. However, the filter algorithm may comprise a computer program in a computer having a high speed processor which can cycle through the image in a step by step fashion. A suitable filter of this type could include a program written in a high level language such as C and run on a processor such as a 80486, which has processing speeds of 25MHz and higher. This however would require longer processing time than hardwiring and the time would be dependent on the complexity of the filter logic.

The invention has been described with reference to the preferred embodiments thereof, which are meant to be illustrative and not limiting. Various changes can be made without departing from the spirit and scope of the invention as defined by the appended claims.

What is claimed is:

1. A color spatial filtering apparatus for improving black quality and reducing intercolor bleeding in a color ink jet printer, comprising:

input signal receiving means for receiving input data signals representing a color image in a predetermined color space in color pixel planes, one color pixel plane representing each color of the color space;

a buffer for storing said data signals;

summing means for summing said color pixel planes into a composite pixel plane;

examining means for incrementally examining each pixel and a surrounding matrix of pixels around each said pixel in the composite pixel plane, said examining means determining for each pixel whether said pixel is black and, if so, further determining whether said surrounding matrix of pixels contains (a) adjacent blank areas, (b) adjacent non-black color areas, or (c) adjacent black areas;

logic means for determining a preferred representation of each pixel, based on a predetermined set of rules for increasing black picture quality and minimizing intercolor bleed, said rules including (a) representation of black pixels for subsequent printing by a first ink having a predetermined bleed characteristic when said surrounding matrix of pixels is determined to contain one of the group of adjacent black areas and adjacent blank areas and (b) representation of black pixels for subsequent printing by a second ink having a lesser bleed characteristic when said surrounding matrix of pixels is determined to contain adjacent color areas; and update means for updating said color pixel planes with an updated representation of each said pixel in the buffer as determined by said logic means.

2. The filtering apparatus of claim 1, wherein said logic means includes a gate array.

3. The filtering apparatus of claim 1, wherein said summing means includes an "OR" gate array.

4. The filtering apparatus of claim 1, further including a transforming means for transferring said input data signals to CYMK color space.

5. The filtering apparatus of claim 1, wherein said predetermined color space is CYMK.

6. The filtering apparatus of claim 1, wherein five color planes are utilized and said updating means updates said color planes with updated values for C, Y, M and $K_1$ and $K_2$, where $K_1$ is a low bleed black ink and $K_2$ is a black ink having a higher bleed and higher quality than said $K_1$.

7. The filtering apparatus of claim 1, further including a mode switch located on the ink jet printer movable between an on and an off position for activating said filtering apparatus.

8. The filtering apparatus of claim 1, wherein said logic means includes a lookup table having the predetermined set of rules.

9. The filtering apparatus of claim 8, wherein said lookup table includes values for two black inks, each black ink having different bleed characteristics and picture quality.

10. A color spatial filtering method for improving black quality and reducing intercolor bleeding in a color ink jet printer having at least one color ink and Black ink and a print buffer, comprising the steps of:

(a) receiving input data signals representing a color image in a predetermined color space from a signal source in predetermined color pixel planes, one pixel plane representing each color in the predetermined color space;

(b) summing said color pixel planes into a composite pixel plane;

(c) iteratively examining each pixel and a surrounding matrix of pixels around each said pixel in the composite pixel plane, said examining step determining for each pixel whether said pixel is black and, if so, further determining whether said surrounding matrix of pixels contains (a) adjacent blank areas, (b) adjacent non-black color areas, or (c) adjacent black areas;

(d) determining a preferred representation of each said pixel, based on a predetermined set of rules for increasing black picture quality and minimizing intercolor bleed, said rules including (1) representation of black pixels for subsequent printing by a first black ink having a predetermined bleed characteristic when said surrounding matrix of pixels is determined to contain one of the group of adjacent black areas and adjacent blank areas and (2) representation of black pixels for subsequent printing by a second ink having a lesser bleed characteristic than said first black ink when said surrounding matrix of pixels is determined to contain adjacent color areas;

(e) updating said color pixel planes with an updated representation of each said pixel as determined in step (d);

(f) repeating steps (c) through (e) until all pixels have been examined; and (g) storing the updated representation of each pixel for subsequent printing of the data signals by the ink jet printer.

11. The filtering method of claim 10, further including the step of transforming said input data signals from said predetermined color space to CYMK color space having four color planes, one for each color C,Y,M and K prior to step (b).

12. The method of claim 10, wherein said examining step includes examining a $5 \times 5$ matrix of pixels.

13. The method of claim 10, wherein said determining step includes comparing the matrix with a lookup table.

14. The method of 10, wherein said updating step updates the examined pixel with a value comprising at least one of the colors C,Y,M and K.

15. The method of claim 10, wherein said updating step updates the examined pixel with a value representing one of $K_1$ and $K_2$, where $K_1$ is said second ink and is a low bleed, fast drying black ink and $K_2$ is said first ink and is a black ink having a higher bleed and slower drying capability than $K_1$.

16. A color ink jet printer and filtering apparatus for improving black quality and reducing intercolor bleeding comprising:

an ink jet printer including a printhead and Cyan, Yellow, Magenta and Black inks (C,Y,M,K);

input signal receiving means for receiving input data signals representing a color image in a predetermined color space in color pixel planes, one color pixel plane representing each color of the color space;

a buffer associated with said printer for storing said data signals;

summing means for summing said color pixel planes into a composite pixel plane as the data signals flow to said buffer;

examining means for incrementally examining each pixel and a surrounding matrix of pixels around each said pixel in the composite pixel plane as the data signals flow to said buffer, said examining means determining for each pixel whether said pixel is black and, if so, further determining whether said surrounding matrix of pixels contains (a) adjacent blank areas, (b) adjacent non-black color areas, or (c) adjacent black areas;

logic means for determining a preferred representation of each pixel as the data signals flow to the buffer, based on a predetermined set of rules for increasing black picture quality and minimizing intercolor bleed, said rules including (a) representation of black pixels for subsequent printing by a first ink having a predetermined bleed characteristic when said surrounding matrix of pixels is determined to contain one of the group of adjacent black areas and adjacent blank areas and (b) representation of black pixels for subsequent printing by a second ink having a lesser bleed characteristic when said surrounding matrix of pixels is determined to contain adjacent color areas; and update means for updating said color pixel planes with an updated representation of each pixel in the buffer for subsequent printing of each pixel in one or more of said Cyan, yellow, Magenta and Black inks as determined by said logic means.

17. The color ink jet printer and filtering apparatus of claim 16, wherein said logic means includes a gate array.

18. The color ink jet printer and filtering apparatus of claim 16, wherein said summing means includes an "OR" gate array.

19. The color ink jet printer and filtering apparatus of claim 16, further including a transforming means for transferring said input data signals to CYMK color space.

20. The color ink jet printer and filtering apparatus of claim 16, wherein said predetermined color space is CYMK.

21. The color ink jet printer and filtering apparatus of claim 16, wherein five color planes are utilized and said updating means updates said color planes with updated values for C, Y, M and $K_1$ and $K_2$, where $K_1$ is a low bleed, black ink and $K_2$ is black ink having higher bleed and higher quality than said $K_1$ black ink.

22. The color ink jet printer and filtering apparatus of claim 16, further including a mode switch located on the ink jet printer movable between an on and an off position for activating said filtering apparatus.

23. The color ink jet printer and filtering apparatus of claim 16, wherein said logic means includes a lookup table having the predetermined set of rules.

24. The color ink jet printer and filtering apparatus of claim 23, wherein said lookup table includes values for two black inks, each having different bleed characteristics and picture quality.

25. A color ink jet filtering method which modifies a color image containing pixels to be printed in combinations of Cyan, Magenta, Yellow and Black to allow a slow dry black ink to be used with fast dry color inks without intercolor bleeding, the filtering method including the steps of:
 1) converting incoming three color (CYM) black pixels into (K) black pixels;
 2) determining, for each (K) black pixel, if the (K) black pixel is part of a substantial black area by examining a matrix of pixels surrounding the (K) pixel;
 3) replacing the (K) black pixel with a three color black (CYM) if the (K) black pixel is determined to not be a part of a substantial black area; and
 4) erasing all color pixels within a predetermined pixel radius of the (K) black pixel if the (K) black pixel is determined to be part of a substantial black area.

26. The filtering method of claim 25, wherein said determining of a substantial black area utilizes a matrix of neighboring pixels and determines that a substantial black area exists if either: the (K) black pixel has a neighboring second black pixel above or to the left of the (K) black pixel; or if the (K) black pixel has neighboring second black pixels to the right and directly below the (K) black pixel and these neighboring second black pixels have neighboring third black pixels to the right or directly below said second black pixels.

27. The filtering method of claim 25, wherein said determining of a substantial black area utilizes a matrix of neighboring pixels and further determines that a substantial black area exists if
 the (K) black pixel meets the criteria of having neighboring second black pixels (a) to the left and above the (k) black pixel, (b) to the left and below the (K) black pixel, (c) to the right and below the (K) black pixel, (d) to the right and above the (K) black pixel (e) to the right and left of the (K) black pixel, or (f) above and below the (K) black pixel, and wherein the second black pixels have neighboring third black pixels as determined by the preceding criteria and the third neighboring black pixels have fourth neighboring pixels as determined by the preceding criteria.

28. The filtering method of claim 25, wherein said erasing step erases all color pixels within a 3 pixel radius.

* * * * *